United States Patent [19]

Karube

[11] Patent Number: 4,800,567
[45] Date of Patent: Jan. 24, 1989

[54] HIGH-FREQUENCY-DISCHARGE EXCITED GAS LASER

[75] Inventor: Norio Karube, Machida, Japan

[73] Assignee: Fanuc Ltd, Minamitsuru, Japan

[21] Appl. No.: 117,149

[22] PCT Filed: Jan. 28, 1987

[86] PCT No.: PCT/JP87/00059
§ 371 Date: Sep. 28, 1987
§ 102(e) Date: Sep. 28, 1987

[87] PCT Pub. No.: WO87/04868
PCT Pub. Date: Aug. 13, 1987

[30] Foreign Application Priority Data

Jan. 29, 1986 [JP] Japan .................................. 61-15594
Jan. 29, 1986 [JP] Japan .................................. 61-15596

[51] Int. Cl.⁴ ............................................. H015 3/097
[52] U.S. Cl. ........................................ 372/87; 372/88
[58] Field of Search ..................... 372/86, 87, 88, 82

[56] References Cited

U.S. PATENT DOCUMENTS

| 4,207,540 | 6/1980 | Ernst | 372/86 |
|---|---|---|---|
| 4,380,079 | 4/1983 | Cohn et al. | 372/87 |
| 4,455,658 | 6/1984 | Sutter, Jr. | 372/82 |
| 4,488,309 | 12/1984 | Tanaka et al. | 372/87 |
| 4,553,242 | 11/1985 | Opower et al. | 372/87 |

Primary Examiner—Léon Scott, Jr.
Attorney, Agent, or Firm—Staas & Halsey

[57] ABSTRACT

A high-frequency-discharge excited gas laser is provided, which is adapted to excite a laser gas by applying of a high frequency voltage to electrodes. In order to increase the output capacity of the high-frequency-discharge excited gas laser without sacrificing its virtues of small size, high efficiency and good beam mode, the laser, in its one aspect, has its metallic electrode (1) covered with a dielectric layer (2), with the dielectric layer being detached from the electrode. In another aspect, a pair of metallic films are laid positions diametrically opposite to each other on the outer surface of a laser tube formed of a dielectric pipe.

20 Claims, 2 Drawing Sheets

HIGH-FREQUENCY-DISCHARGE EXCITED GAS LASER

BACKGROUND OF THE INVENTION

The present invention relates to a high-frequency-discharge excited gas laser, and more particularly to a laser of this kind with augmented output capacity.

A high-frequency-discharge excited gas laser has the following advantages:

(i) it is especially suitable to make a $CO_2$ laser, which employs highly reactive $CO_2$ gas, since metallic electrodes do not come in contact with the laser gas;

(ii) being of a capacitive ballast type, the laser has high energy efficiency;

(iii) since a transverse electric discharge requiring relatively low voltage can be used, a power source composed of solid state devices will suffice, so that the size of the equipment can be reduced; and (iv) good electric discharge uniformity is obtainable using this excitation mode, resulting in good output beam characteristics.

For these reasons, the high-frequency-discharge excited gas laser (i) can be made small,
(ii) performs with high efficiency, and
(iii) produces good output beam characteristics; and moreover makes an excellent $CO_2$ gas laser for tooling or machining applications such as cutting.

In order to secure stable electric discharge, the high-frequency-discharge excited gas laser is constructed such that the voltage drop that occurs between the surfaces of the dielectric layer is of the same magnitude as the discharge sustaining voltage. Here, employed as the ballast for obtaining uniform electric discharge is a capacitive ballast which consumes less electric power than a resistor ballast does. Electrodes 10, 10 of a conventional high-frequency-discharge excited $CO_2$ laser each comprise, as shown in FIGS. 1 and 2, an iron tube 11 and a glass lining layer 12 of thickness 0.8–1.2 mm coated on the iron tube 11. Laser gas is excited as a high frequency voltage from a high frequency power source 13 is applied to the iron tubes 11, 11 of the respective electrodes 10, 10. Since the discharge sustaining voltage for the laser is 5–10 kV, about the same voltage is applied to the lining layer 12. Therefore, the layer 12 must be able to withstand the voltage of 5 kV at the lowest.

To make a strong coat on the iron tube 11, the material of the lining layer 12 ought to be of a kind which sticks itself firmly on the iron tube 11 and ought to have a thermal expansion coefficient equal to that of the iron tube 11, lest the layer 12 should peel off as the iron tube 11 expands with heat. Therefore, it was not sufficient to select a material for the lining layer 12 only from the viewpoint of electrical properties. Also, since the conventional layer is formed through a coating process, pinholes are unavoidable. It undergoes dielectric breakdown as the current applied is increased. If such dielectric breakdown occurs or pinholes exist, the current concentrates there, so that it is difficult to increase the current; that is, the input electric power cannot be raised beyond a certain level, e.g., 1 kW. Therefore, with a conventional laser of this kind, it is difficult to increase the input electric power by increasing the current density, and for this reason it was necessary to enlarge the electric discharge region. As a result, the distance between the electrodes need be greater than 40 mm, wherefore it was difficult to obtain a good $TEM_{00}$ mode. Another reason for the difficulty in obtaining a good beam mode is the fact that this kind of electrode structure is adopted for an orthogonal type laser.

SUMMARY OF THE INVENTION

It is an object of the present invention to provide a high-frequency-discharge excited gas laser of high output power which is equipped with a capacitive ballast layer for obtaining uniform elecric discharge.

According to one aspect of the present invention, in a high-frequency-discharge excited gas laser adapted to excite a laser gas by means of a high frequency voltage applied to metallic electrodes, a covering of a dielectric substance having ballast effect is disposed so as to cover the metallic electrode without contacting the electrode by being detached therefrom.

According to another aspect of the present invention, a pair of metal films as metallic electrodes are laid at positions diametrically opposite to each other on the outer surface of a laser tube formed of a dielectric pipe having ballast effect and necessary mechanical strength, and a high frequency power source is connected between the metallic films.

As described above, in the present invention, in order to select a dielectric material to compose the ballasts purely from the viewpoint of electric properties (dielectric constant, dielectric breakdown, electric field intensity, etc.) without paying any regard to such considerations as the adhesiveness to metallic electrodes and the thermal expansion coefficient which is to conform to that of the metallic electrodes, the metallic electrodes and the dielectric ballasts are provided such that they are detached from each other, or a pair of filmy metallic electrodes are formed on the outer surface of the dielectric ballast, so that it is possible to employ relatively thick dielectric bodies, and thus no pinholes occur and dielectric breakdown is avoided. Consequently, it is possible to raise the level of input electric power per unit volume for electric discharge so much that the laser output goes beyond 1 kW. Also, by employing a resonator of reduced diameter, it is possible to obtain the $TEM_{00}$ mode similar to that produced in a DC discharge excited coaxial $CO_2$ laser. Therefore, a tooling or machining laser as efficient as the DC discharge excited coaxial $CO_2$ laser can be provided.

DESCRIPTION OF THE PREFERRED EMBODIMENT

Figure 1:
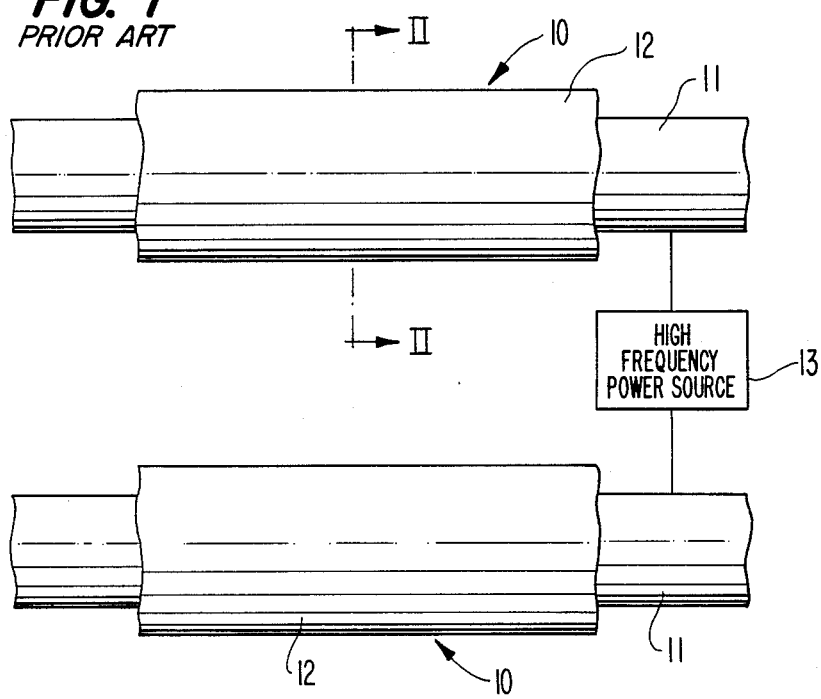
FIG. 1 is a schematic view of a conventional high-frequency-discharge excited gas laser.
Figure 2:
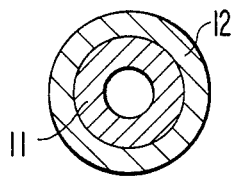
FIG. 2 is a schematic cross-sectional view taken along line II—II of FIG. 1.
Figure 4:
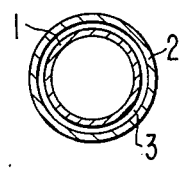
FIG. 4 is a schematic cross-sectional view taken along line IV—IV of FIG. 3.
Figure 3:
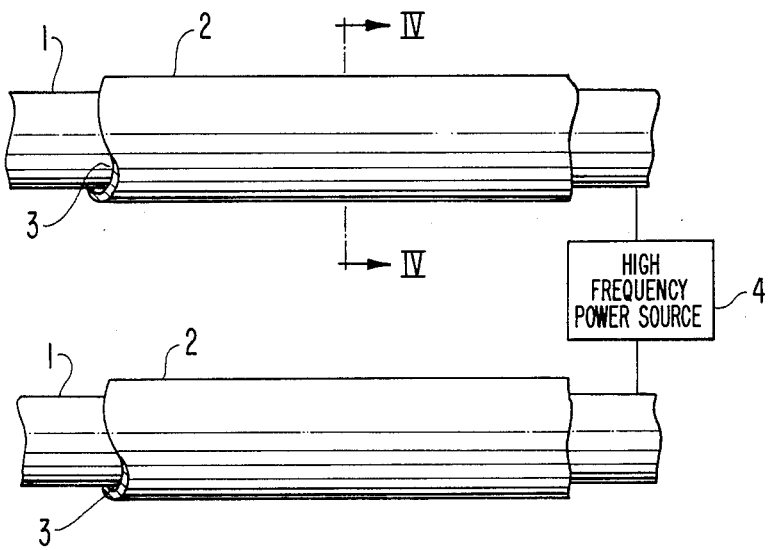
FIG. 3 is a schematic view of a high-frequency-discharge excited gas laser according to a first embodiment of the present invention.

FIGS. 3 and 4 show a high-frequency-discharge excited gas laser according to a first embodiment of the present invention.

Reference numeral 1 designates metallic electrodes, each of which is a pipe made of iron, for example, and reference numeral 2 designates coverings (hereinafter referred to as dielectric layers) formed of dielectric ceramic pipes having ballast effect which is effective to obtain uniform electric discharge. Each dielectric layer 2 covers the respective metallic electrode 1 with a clearance 3. Two electrodes each formed by the metallic electrode 1 and the dielectric layer 2 are arranged in a laser tube, not shown. As a high frequency voltage, generated by a high frequency power source 4, is applied between these metallic electrodes 1, 1, the laser gas flowing in the laser tube is excited to thereby create laser beams. The high-frequency-discharge excited gas laser of the present embodiment differs from the conventional one in that the metallic electrode 1 is separated from the dielectric layer 2 by the clearance 3, and there is no further structural difference between the two.

Incidentally, it should be noted that the provision of the clearance 3 is not necessarily required, but the dielectric layer 2 can be laid on the metallic electrode 1 without a clearance therebetween, so long as the layer 2 is not fastened to the metallic electrode. Also it is possible to fill the clearance 3 with a highly electric conductive paste. The voltage drop V that occurs in the dielectric layer 2 formed as above is given by the following equation, which is obtained by a simple calculation.

$$V = di_0/\epsilon\omega \quad (1)$$

where $i_0$ is the current density, $\epsilon$ the dielectric constant of the dielectric layer 2, $\omega$ the applied voltage frequency, and d the thickness of the dielectric layer 2. In order to stabilize the electric discharge, the voltage drop V ought to be a value in the vicinity of the electric discharge sustaining voltage, so that to find an appropriate thickness d of the dielectric layer 2, $V_0$ is substituted for V in the equation (1), and the resulting equation is solved for d to obtain an equation:

$$d = V_0\epsilon\omega/i_0 \quad (2)$$

In the case of the embodiment shown in FIG. 3, since there are two dielectric layers 2, 2, the thickness of each dielectric layer 2 ought to be one half of the value d obtained by the equation (2). The electric field intensity E created inside the dielectric layer 2 is given by an equation:

$$E = i_0/\epsilon\omega \quad (3)$$

If $E_0$ is the dielectric breakdown electric field intensity of the dielectric layer 2, then the dielectric breakdown is avoided so long as the electric field intensity E is equal to or lower than $E_0$, i.e., $$E \leq E_0 \quad (4)$$

Combining the equations (3) and (4), we obtain:

$$i_0 \leq E_0\epsilon\omega \quad (5)$$

which tells that the maximum allowable current density is given as $E_0\epsilon\omega$, so that in order to increase the maximum allowable current density, either the frequency should be increased or a material whose dielectric constant $\epsilon$ and dielectric breakdown electric field intensity $E_0$ give a greater product $E_0\epsilon$ should be selected. Therefore, by increasing the maximum allowable current density and hence increasing the tolerable level of input electric power per unit volume for electric discharge, it is possible to embody a high-frequency-discharge excited gas laser capable of generating an output whose intensity exceeds 1 kW. Since the maximum allowable current density does not depend on the thickness of the dielectric layer 2, the thickness can be selected so as to avoid formation of pinholes, etc., and therefore adaptable manufacture of the dielectric layer 2 is possible.

In view of the electrical properties mentioned above, appropriate materials for the dielectric layer 2 include barium titanate, quartz, alumina, Mylar, and polyimide.

In the embodiment described above, both metallic electrodes 1, 1 are covered with dielectric layer 2, but it is also possible to construct an equally effective laser by having only one of the metallic electrodes covered with dielectric layer 2 and the other naked.

Also, the cross section of the electrode 1 need not be circular, but may be of any shape such as quadrilateral.

Figure 5:
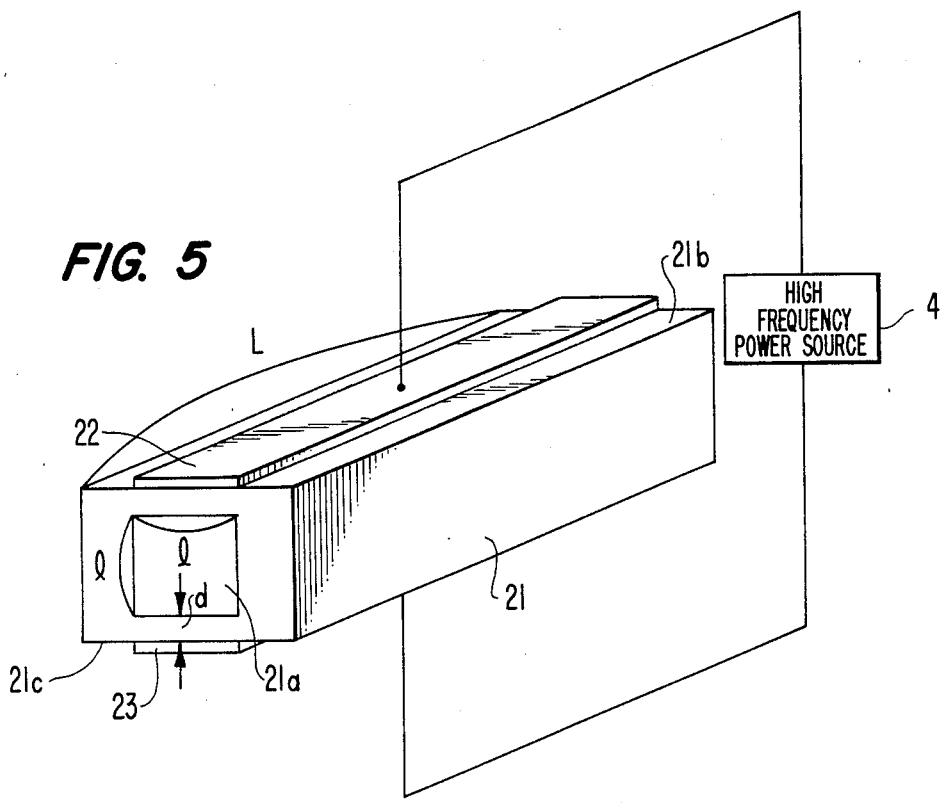
FIG. 5 is a schematic prerspective view of a high-frequency-discharge excited gas laser electrode according to a second embodiment of the present invention.

FIG. 5 shows a coaxial type high-frequency-discharge excited gas laser according to a second embodiment of the present invention, wherein reference numeral 21 refers to a laser tube in the shape of a rectangular parallelepiped pipe made of dielectric ceramic such as alumina. A hollow 21a having a cross section of square 1×1 in size is formed in the laser. As metallic electrodes, metallic films 22, 23 are respectively formed on a pair of opposite outer surfaces of the laser tube 21, i.e., a top face 21b and a bottom face 21c by means of fused metal injection, for instance. These metallic films 22, 23 are connected to a high frequency power source 4, so that the laser gases (a mixture of $CO_2$, $N_2$, He and so on) flowing through the hollow 21a of the laser tube 21 are excited. Since the laser tube 21, itself as a structural component, has a sufficient mechanical strength, the metallic films 22, 23 need to have good electrical conductivity alone, and thus they can be made as thin as one can desire. Consequently, unlike the conventional case, in the case of the present embodiment there is no strict requirement concerning the conformity in characteristics between the dielectric body and the metallic film such as thermal properties, so that the choice of the dielectric material for the laser tube 21 is allowed to be made purely from the viewpoint of the electric properties. In particular, when the metallic films 22, 23 are formed by fused metal injection—which is done, for instance, by highly ionizing metallic powder such as copper and aluminium in He gas, and injecting the powder onto the surfaces 21b, 21c of the laser tube 21 to form metallic films 22, 23 of thickness 30μ—, the resulting metallic films 22, 23 become porous. Therefore, even if the thermal expansion coefficient of the films 22, 23 is not equal to that of the dielectric body 21, there is little fear of cracking and peeling of the films. In contrast, in the conventional laser pipe in which the dielectric body is formed of a dielectric layer adhered to the metallic electrode, if the porous dielectric layer is formed on the metal by fused injection, the laser pipe is quite useless, because the applied current easily penetrates the porous dielectric layer, and hence no ballast effect is obtained. It is therefore only through forming a metallic film on the dielectric body, as in the present invention, that it becomes possible to form a laser electrode combining a dielectric body and a metal which are dissimilar in thermal expansion coefficient and other properties.

Also, since only 1 ampere or so of electric current need flow through the metallic films 22, 23, the thickness of the films can be as thin as 30μ, which is very thin compared with that of the dielectric body (which is generally 2-3 mm). This fact renders it unnecessary to form the films 22, 23 by fused metal injection; plating or evaporation will suffice to form the films, and further the films may be adhered to the dielectric body with electrically conductive adhesive.

Figure 6:
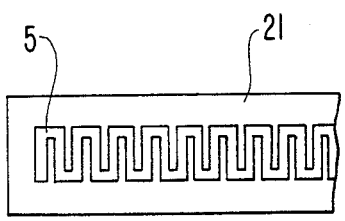
FIG. 6 is a fragmentary schematic plane view showing a modified version of the metallic films shown in FIG. 5.
Figure 7:
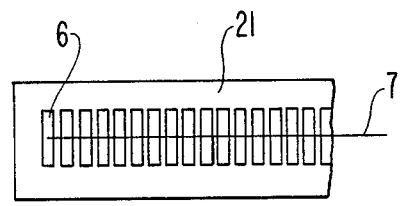
FIG. 7 is a fragmentary schematic plane view showing another modified version of the metallic film.

In order to make it doubly sure that the metallic films 22, 23 won't peel off, they may be formed on the outer surface of the laser tube 21 in a square wave pattern, as shown by reference numeral 5 in FIG. 6, and this can be done through fused metal injection, evaporation, or plating. Further, the metallic film 5 may be glued with an adhesive. Alternatively, many metallic foil pieces 6 may be adhered to the laser tube 21, as shown in FIG. 7, with the foil pieces 6 being connected together via a leading wire 7.

Those walls of the laser tube 21 on which the metallic film 22 or 23 is not formed are made relatively thick (e.g., 5 mm in thickness) to increase the mechanical strength of the laser tube 21. On the other hand, the upper and lower walls on which the films 22 and 23 are respectively formed have the smaller thickness d, which is given by equation (2) as $V\epsilon\omega/2i_0$, whereby the voltage drop through these walls becomes equal to the electric discharge sustaining voltage of the laser plasma to thereby stabilize the electric discharge.

The electric field intensity E created inside the dielectric body is given as $i_0/\epsilon\omega$ by equation (3); in order to avoid dielectric breakdown of the dielectric body, the value $i_0/\epsilon\omega$ should be less than the dielectric breakdown electric field intensity $E_0$ of the dielectric body, wherefore the maximum allowable current density $i_0max$ and the maximum allowable input electric power Wmax are given as follows, respectively;

$$i_0\text{max} = \epsilon\omega E_0 \quad (6)$$

$$W\text{max} = lLV\epsilon\omega E_0 \quad (7)$$

$$\epsilon = K\epsilon_0 \quad (8)$$

where L is the overall length of the laser tube 21, 1 the width of the metal film, $\epsilon_0$ the absolute dielectric constant, and K the relative dielectric constant.

To increase the thickness d of the upper and lower walls for the purpose of increasing the mechanical strength of the laser tube 21 it is necessary to lower the current density, to increase the voltage, to increase the frequency, or to use a material of higher dielectric constant. Similarily, to increase the maximum allowable input electric power Wmax, it is necessary to increase the voltage, to increase the frequency, or to use a material of greater dielectric breakdown strength Eo.

The table below lists the required thickness d and the maximum allowable input electric power Wmax, respectively, of various materials, in the case where l=3 cm, L=1.6M, electric discharge sustaining voltage V=1 kV, and $\omega/2\pi$=100 KHz.

| Dielectrics | K | E (KV/cm) | d (mm) | Wmax (KW) |
|---|---|---|---|---|
| $BaTiO_3$ | 1200 | 30 | 53.4 | 96.2 |
| $SiO_2$ | 3.8 | 160 | 0.17 | 16.2 |
| BeO | 10.1 | 236 | 0.45 | 63.6 |
| $Al_2O_3$ | 9.4 | 394 | 0.42 | 98.9 |

Incidentally, as shown in the equations (3), (4), power W is proportional to both the product V of the voltage V and the applied frequency ω, so that by increasing either or both of these values V and W, it is possible to obtain values greater than those listed in the above table. According to the table, alumina ($Al_2O_3$) is a satisfactory material.

Although the dielectric body, which is required to provide the mechanical strength of the electrodes, is made of ceramic in the above embodiments, the dielectric body need not be ceramic but can be made of any other dielectric material that has sufficient mechanical strength and desirous electrical properties.

In the second embodiment, the laser to which the present invention is applied is of a coaxial type, but it is applicable to a laser of an orthogonal type.

What is claimed is:

1. A high-frequency-discharge excited gas laser adapted to excite a laser gas by means of a high frequency voltage applied from a high frequency power source to metallic electrodes disposed within a stream of laser gas, comprising:
   metallic electrodes disposed within the stream of laser gas, at least one of said metallic electrodes being formed into a tubular shape;
   a tubular covering body made of dielectric material having a ballast effect for establishing a uniform electric discharge, said covering body being disposed to be detached from an outer peripheral surface of said at least one metallic electrode and to cover said outer peripheral surface of said at least one metallic electrode, to permit a difference between thermal properties of said covering body and thermal properties of said at least one metallic electrode, said covering body having walls with a thickness which is sufficient to prevent pinholes from being produced during manufacture of said covering body and to prevent occurrences of dielectric breakdown of said covering body during use.

2. A high-frequency-discharge excited gas laser as claimed in claim 1, wherein said high-frequency-discharge excited gas laser is equipped with a pair of electrodes, and wherein one of said electrodes consists of one of said metallic electrodes and the other consists of said at least one metallic electrode and said covering body.

3. A high-frequency-discharge excited gas laser as claimed in claim 2, wherein said covering body is made of a dielectric material having a high dielectric constant and a high dielectric breakdown electric field intensity.

4. A high-frequency-discharge excited gas laser as claimed in claim 1, wherein said covering body is made of a dielectric material having a high dielectric constant and a high dielectric breakdown electric field intensity.

5. A high-frequency-discharge excited gas laser as claimed in claim 1, wherein the total thickness d of the walls of said covering body is determined by an equation, $d = V\epsilon\omega/2i_0$ where $\epsilon$ is the dielectric constant of the dielectric material forming said covering body, V the discharge sustaining voltage of the laser plasma, $\omega$ the frequency and $i_0$ the current density.

6. A high-frequency-discharge excited gas laser as claimed in claim 1, further comprising highly electrically conductive paste filled between said at least one metallic electrode and said covering body.

7. A high-frequency-discharge excited gas laser as claimed in claim 6, wherein said laser comprises a pair of electrodes, and one of said electrodes consists of one of said metallic electrodes, and the other of said electrodes consists of said at least one metallic electrode and said covering body.

8. A high-frequency-discharge excited gas laser as claimed in claim 6, wherein said covering body is made of a dielectric material having a high dielectric constant and a high dielectric breakdown electric field intensity.

9. A high-frequency-discharge excited gas laser adapted to excite a laser gas by means of a high frequency voltage applied to metallic electrodes disposed within a stream of laser gas, comprising:
 a laser tube composed of a dielectric pipe with a ballast effect for establishing a uniform electric discharge and having a required mechanical strength and a pair of opposite outer faces, said laser tube having walls with a thickness which is set to a value large enough to prevent pinholes from being produced during manufacture of said covering body and to prevent occurrences of dielectric breakdown of said covering body during use;
 metallic films respectively formed on said pair of opposite outer faces of said laser tube, and serving as said metallic electrodes, each of said metallic films having a thickness which is set to a value small enough to prevent said metallic film from peeling off even when thermal properties of said laser tube are different from those of said metallic film; and
 a high frequency power source connected between said metallic films.

10. A high-frequency-discharge excited gas laser as claimed in claim 6, wherein the total thickness d of the walls of the laser tube on which said metallic films are formed is determined by an equation, $d = V\epsilon\omega/2i_0$ where $\epsilon$ is the dielectric constant of the dielectric pipe, V the discharge sustaining voltage of the laser plasma, $\omega$ the frequency and $i_0$ the current density.

11. A high-frequency-discharge excited gas laser as claimed in claim 10, wherein said metallic films are formed through fused metal injection.

12. A high-frequency-discharge excited gas laser as claimed in claim 10, wherein said metallic films are formed on said laser tube in a square wave pattern.

13. A high-frequency-discharge excited gas laser as claimed in claim 10, wherein said metallic films comprise a number of metallic foil pieces separated from each other, and a lead wire connected to each of said metallic foil pieces.

14. A high-frequency-discharge excited gas laser as claimed in claim 6, wherein said metallic films are formed through fused metal injection.

15. A high-frequency-discharge excited gas laser as claimed in claim 6, wherein said metallic films are formed on said laser tube in a square wave pattern.

16. A high-frequency-discharge excited gas laser as claimed in claim 6, wherein said metallic films comprise a number of metallic foil pieces separated from each other, and a lead wire connected to each of said metallic foil pieces.

17. A high-frequency-discharge excited gas laser for exciting a stream of laser gas through the application of a high frequency voltage, comprising:
 a first electrode disposed within the stream of laser gas;
 a second electrode disposed within the stream of laser gas, said first and second electrodes being coupled to the high frequency voltage; and
 a dielectric material surrounding at least a portion of said second electrode and detached from said second electrode, said dielectric material having a ballast effect for establishing a uniform electric discharge.

18. A high-frequency-discharge excited gas laser as claimed in claim 17, wherein said dielectric material is spaced apart from said second electrode.

19. A high-frequency-discharge excited gas laser as claimed in claim 18, further comprising a conductive paste in the space between said second electrode and said dielectric material.

20. A high-frequency-discharge excited gas laser as claimed in claim 17, further comprising additional dielectric material surrounding said first electrode and detached from said first electrode.

* * * * *